March 7, 1933.     G. H. JUERGENS     1,900,716
WIRE GLASS MANUFACTURE
Filed Jan. 10, 1930     2 Sheets-Sheet 1

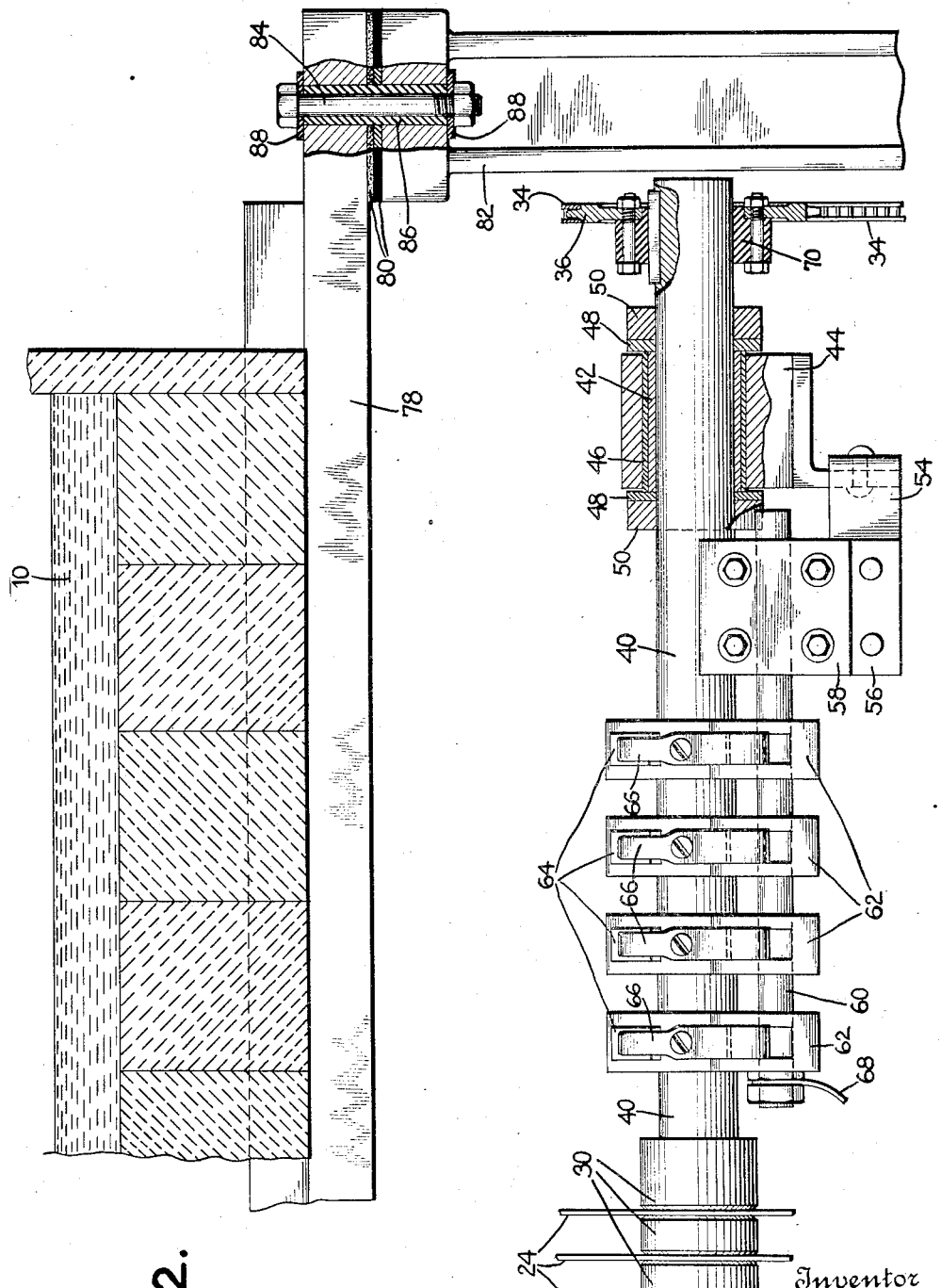

Patented Mar. 7, 1933

1,900,716

UNITED STATES PATENT OFFICE

GUSTAV H. JUERGENS, OF ST. LOUIS, MISSOURI, ASSIGNOR TO MISSISSIPPI GLASS COMPANY, OF NEW YORK, N. Y., A CORPORATION OF NEW YORK

WIRE GLASS MANUFACTURE

Application filed January 10, 1930. Serial No. 419,792.

This invention pertains to the manufacture of wire inserted glass by the continuous process in which the reinforcing wire is drawn through the molten metal prior to becoming incorporated in the glass sheet at the forming pass.

In that process it has been very difficult to prevent imperfections in the glass closely surrounding the wire. Some of the imperfections are due to the fact that cold wire is fed into and through molten metal with the result that shrinkage stresses are set up between wire and glass and these stresses sometimes produce visible defects in the sheet.

Other imperfections are due to the fact that the wire carries dirt and foreign matter of various kinds on its surface into the molten metal. This material often becomes plainly visible in the finished sheet and impairs the quality thereof.

Attempts to remove the dirt from the wire by mechanical and chemical means have not been successful. The fact that the wire is coated with a thin film of oil applied during its manufacture adds to the difficulties of chemical or mechanical removal.

The principal object of the present invention is to solve the above problems by preheating the wire before it is introduced into the molten metal.

Further and other objects and advantages will be apparent from the accompanying specification and claims, and from the drawings which illustrate what is now considered the preferred embodiment of the invention.

Fig. 2 is a view on the line 2—2 of Fig. 1.

Figure 1:
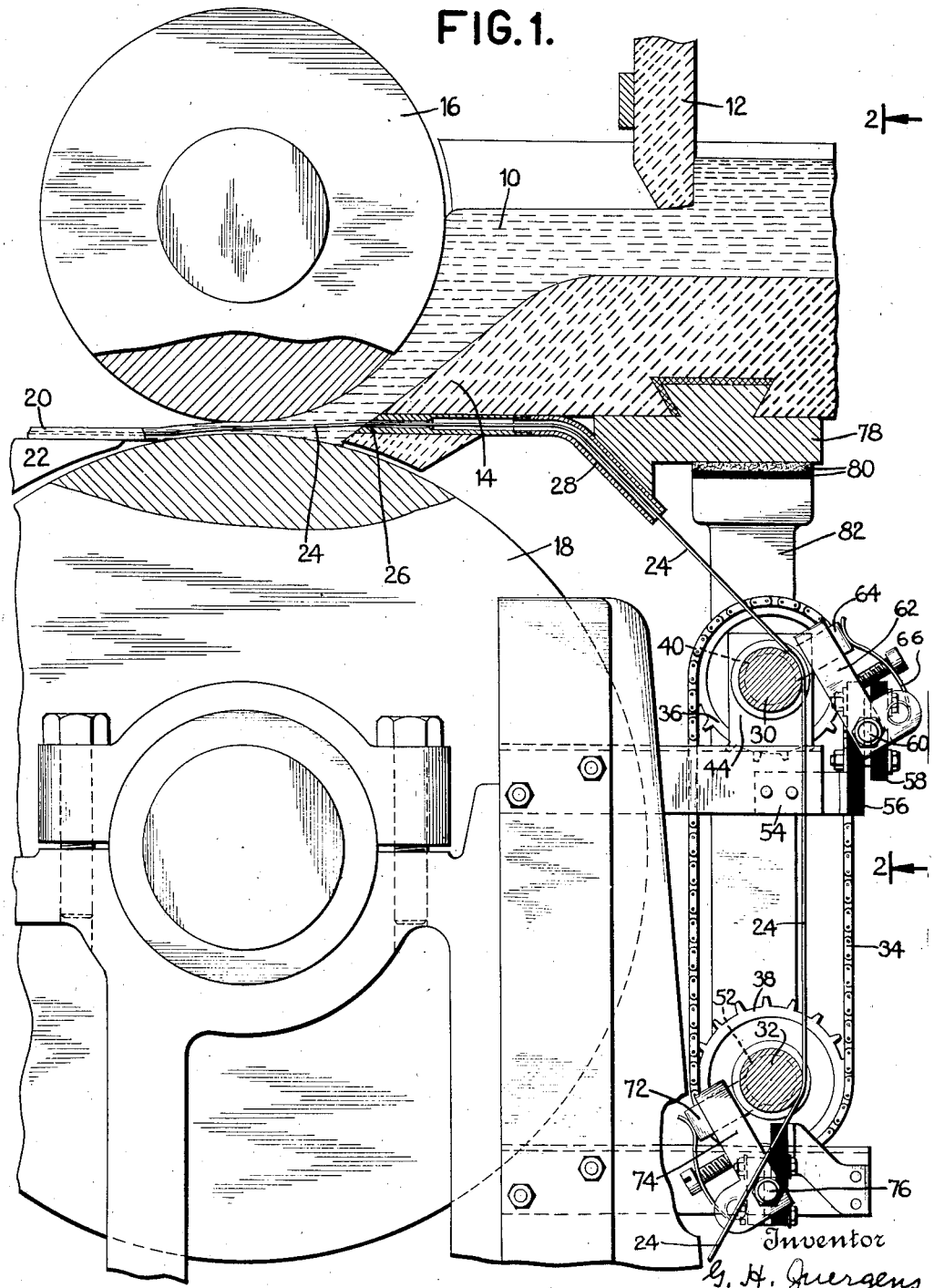
Fig. 1 shows the invention applied to a preferred type of glass rolling apparatus.

In the drawings molten metal 10, controlled by a gate 12, is fed over a lip 14 to a horizontal sheet-forming pass between upper and lower rolls 16 and 18. The glass emerges from the forming pass as a sheet 20 and is conducted over apron 22 to a leer.

As the sheet of glass is being formed it draws reinforcing material 24 from an orifice or orifices 26 in lip 14, through molten metal 10, and into the forming pass, where it becomes an integral part of the finished sheet of reinforced glass. The orifices are at the ends of tubular passages 28, to which the wire is fed by rollers 30, 32 interconnected by chain 34 and sprockets 36, 38.

The above described apparatus is adapted for the manufacture of a certain type of wire inserted glass and the improvements covered by the present invention will now be described as applied to that apparatus.

Broadly, the invention covers the preheating of wire 24, and in the present embodiment of the invention the preheating is done electrically by passing current through the wires while they are passing from roller 32 to roller 30. As shown in Fig. 2, roller 30 is carried on a shaft 40 which rotates in bearings such as 42 insulated from frame bracket 44 by insulating sleeve 46 and collars 48 held in position by metal collars 50 fast on shaft 40. There is a similar arrangement at the other end of shaft 40. Shaft 52, supporting lower feed roller 32, runs in ordinary bearings, and it is therefore grounded to the machine.

Fast to the frame of the machine is an angle member 54 to which is attached a fibre clamp comprising bars 56—58 which support a steel bar 60 parallel to shaft 40. Clamped on bar 60 are a number of brush holders 62, each holding a carbon brush 64 which is pressed against shaft 40 by a spring 66. Current is supplied to the brushes through cable 68 fast to the free end of bar 60. Inasmuch as sprocket 36 is provided with an insulating hub 70, there is no outlet for current introduced through wire 68 except through shaft 40, drum 30, reinforcing wires 24, drum 32, and shaft 52, thence through carbon brushes 72, holders 74, bar 76 to source, the lower brushes and supports being substantially similar to the upper devices already described in detail.

The electric current supplied as above to wires 24 serves to heat those wires a predetermined amount, thereby allowing them to enter molten metal 10 at a temperature approaching the temperature of the molten metal. At the same time, the heat of the wires burns off all volatile and gas forming substances, melts the coating of oil from the wires, and the oil as it leaves the wire carries with it the dirt and other foreign matter from the surface of the wire. The wire therefore enters the molten metal clean and hot with the result that a product of uniform high quality is produced.

Since the machine frame is grounded, it is advisable to insulate lip 14 from the machine in order to prevent short circuits from wire 24 through tube 28, lip 14, and lip-supporting plate 78. This insulation is accomplished by fiber pads 80 placed between plate 78 and frame columns 82, and by insulating the plate anchor bolts 84 by means of fibre sleeves 86 and fibre washers 88.

It is to be understood that the invention is not limited to the specific construction herein described but may be used in other ways without departure from its spirit as defined by the claims which follow.

I claim—

1. In apparatus of the class described, in combination, a forming pass, means for feeding molten metal to said forming pass, means for feeding reinforcing wire to said pass through said metal, and means for preheating said wire while being fed, whereby said wire enters the molten metal at a comparatively high temperature, said preheating means comprising devices for supplying electric current to said wires while they are under control of said feeding means.

2. In apparatus of the class described, in combination, a forming pass, means for feeding molten metal to said forming pass, means for feeding reinforcing wire to said pass through said metal, and means for preheating said wire while being fed, whereby said wire enters the molten metal at a comparatively high temperature, said feeding means comprising spaced feeding rollers and means for driving said rollers, said preheating means comprising devices for supplying electric current to the wires while they are passing from one of said feed rolls to the other.

3. In apparatus of the class described, in combination, a forming pass, means for feeding molten metal to said forming pass, means for feeding reinforcing wire to said pass through said metal, and means for preheating said wire while being fed, whereby said wire enters the molten metal at a comparatively high temperature, said feeding means comprising spaced feeding rollers and means for driving said rollers, said rollers being utilized to supply electric current to said wires while the wires are passing from one of said rolls to the other whereby the wires are preheated, substantially as described.

In testimony whereof I hereto affix my signature.

GUSTAV H. JUERGENS.